March 17, 1970  J. ROFFLER  3,500,796
APPARATUS FOR SEPARATING WATER FROM WET STEAM PRIOR TO
SUPERHEATING OF THE STEAM
Filed Sept. 6, 1968  4 Sheets-Sheet 2
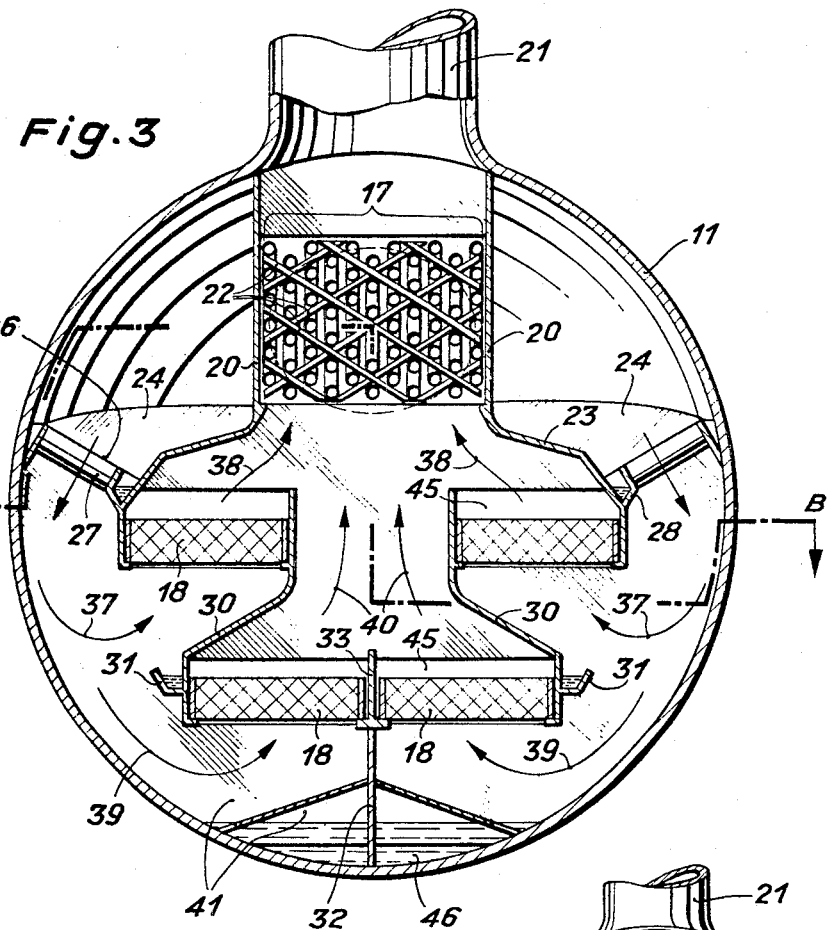
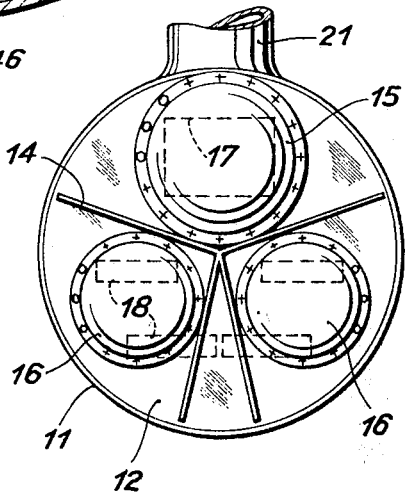
Inventor:
Josua Roffler
By Kenyon & Kenyon
Attorneys March 17, 1970  J. ROFFLER  3,500,796
APPARATUS FOR SEPARATING WATER FROM WET STEAM PRIOR TO
SUPERHEATING OF THE STEAM
Filed Sept. 6, 1968  4 Sheets-Sheet 1

Inventor:
JOSUA ROFFLER
BY Kenyon & Kenyon
ATTORNEYS

Fig. 5

United States Patent Office 3,500,796
Patented Mar. 17, 1970

3,500,796
APPARATUS FOR SEPARATING WATER FROM WET STEAM PRIOR TO SUPERHEATING OF THE STEAM
Josua Roffler, Winterthur, Switzerland, assignor to Sulzer Brothers, Ltd., Winterthur, Switzerland, a corporation of Switzerland
Filed Sept. 6, 1968, Ser. No. 757,917
Claims priority, application Switzerland, Sept. 6, 1967, 12,480/67; July 19, 1968, 10,902/68
Int. Cl. F22b 37/28; B01d 50/00
U.S. Cl. 122—34                           9 Claims

ABSTRACT OF THE DISCLOSURE

The separator is positioned in the flow of wet steam and includes a horizontally disposed tank having a lower portion containing separator elements and an upper portion containing superheater tubes. The wet steam is introduced into the upper portion of the tank along side the superheater tubes to flow longitudinally of the axis of the tank and is thereafter distributed uniformly into the lower section of the tank to flow upwardly through the separators. Water is separated out in the lower section by gravity and by the separators. The dehydrated steam then flows upwardly into the superheater and flows out of the tank.

---

This invention relates to an apparatus for separating water from wet steam in steam power stations.

It has been known in the past to supply steam power stations with wet steam, for example, from subterranean sources and to separate the water from the steam prior to superheating of the steam. In order to separate the water from the steam, such steam power stations have utilized apparatus in which the wet steam is at first partially expanded in a high pressure stage so that water droplets can be removed from the steam. The steam is then superheated by a flow of high pressure saturated steam before being fed to a second pressure stage of the prime mover. However, such separator techniques have required large spaces within which to carry out the separation of the water from the steam.

Briefly, the present invention provides an apparatus of limited space for separating water from wet steam so that the wet steam can be subsequently superheated. The apparatus includes a horizontally disposed and substantially cylindrical tank having a lower portion which houses water separator elements in a shelf-like manner on two levels and an upper portion which houses a bank of superheater tubes. The flow of wet steam is passed into one end of the tank to flow, at first, longitudinally of the tank and then circumferentially before flowing through the water separators to the bank of superheater tubes. The flow of superheated steam then flows radially out of the tank. The superheater tubes in the upper tank portion are arranged longitudinally of the tank and are disposed between two walls which also extend longitudinally of the tank. Each of these walls cooperates with a spigot at one end of the tank and the sidewalls of the tank to confine the inflow of wet steam to a longitudinal distribution chamber in the upper portion of the tank alongside the bank of superheater tubes. In addition, each wall has a portion on each side of the tank which separates the distribution chamber from the lower portion of the tank. Further, each of these wall portions has at least one aperture therein for conducting flow of wet steam therethrough into a lower portion of the tank for subsequent flow through the water separators disposed therein. The apertures between the distribution chambers and the lower portion of the tank are arranged in such a way that wet steam flowing through them is hurled against the inner walls of the tank so that some of the water droplets are removed from the wet steam before reaching the water separators. This provides an additional separation action.

In another embodiment, baffles are arranged on each level in the lower portion of the tank where the steam enters the separate elements. These baffles extend over the flow cross-section and contain orifices distributed over the flow cross-section to smooth out any turbulence.

In operation, the flow of wet steam initially enters the tank and flows longitudinally along the distribution chambers. Thereafter, the wet steam enters into the lower portion of the tank through the apertures in the walls between the upper and lower tank portions. Droplets of water are then hurled against the sides of the tank and run down the walls of the tank to the lowermost portions of the tank. At the same time, wet steam is directed to flow upwardly through the water separator elements towards the bank of superheater tubes in the upper portion of the tank. In flowing through the water separator elements, the wet steam is further dehydrated so that the steam passing into the superheater tubes is free of any water droplets or particles. After passing over the superheater tubes, the steam is then let out of the tank through one or more spigots in the upper portion of the tank.

The invention will become more apparent from the following detailed description and the accompanying drawings in which:

FIG. 2 is a front view of an apparatus according to the invention;

FIG. 3 illustrates a cross section through the apparatus of the invention;

FIG. 5 illustrates a cross-sectional view through a modified apparatus of the invention.

Figure 1:
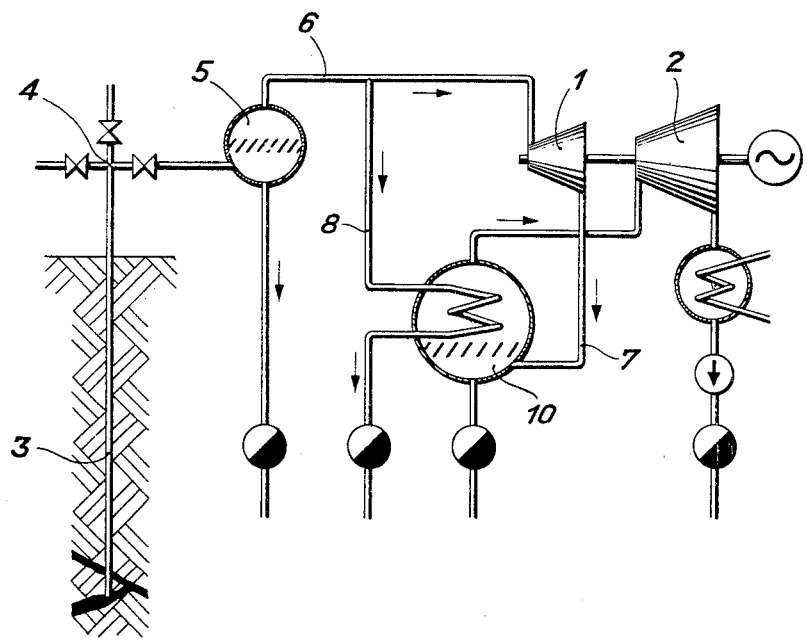
FIG. 1 illustrates a schematic flow diagram of a steam power station embodying the apparatus of the invention.

Referring to FIG. 1 the steam power station includes a high pressure turbine 1 and a low pressure turbine 2 which utilize steam originating from a subterranean source. The wet steam is initially collected in a line 3 from underground and is conveyed via a distributing cross 4 to a saturated steam separator 5 in which the steam is first dried. A line 6 connects the separator 5 to the high pressure turbine 1 to deliver a flow of steam thereto. The high pressure turbine 1 is further connected by line 7 to a unit 10 wherein water droplets in the steam are removed so that the steam can then be transferred into the low pressure turbine 2 downstream of the unit 10. A line 8 which branches from line 6 conducts a second flow of steam from the separator 5 through the unit 10 in a heat exchange relation with the dehydrated steam passing through the unit 10. The partially expanded steam leaving the unit 10 is supplied via a line 7' to the lower pressure turbine 2.

Figure 4:
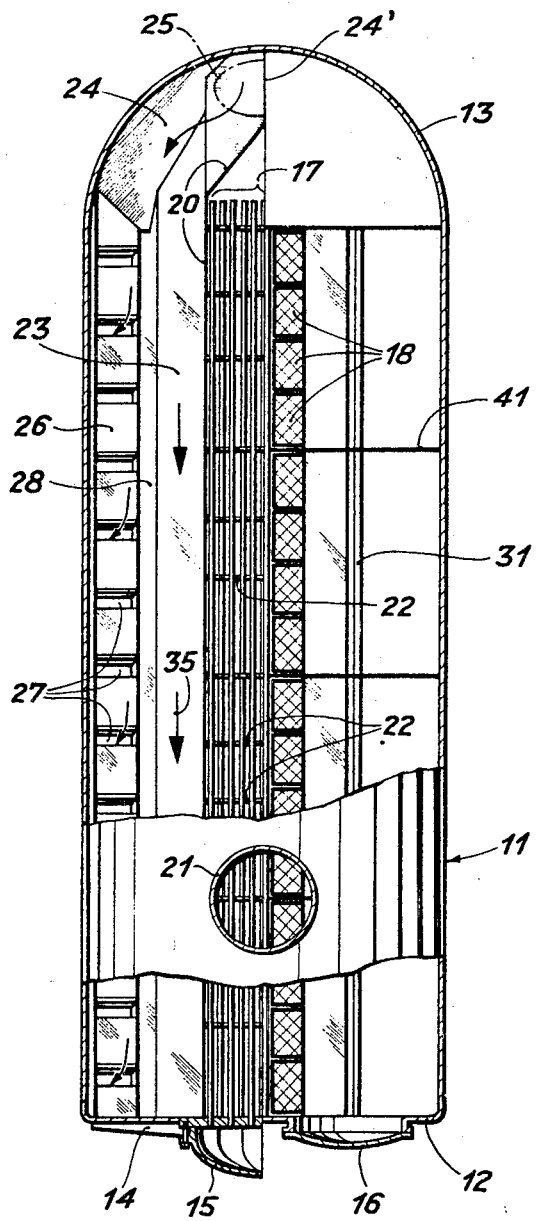
FIG. 4 illustrates a view taken on line A–B of FIG. 3.

Referring to FIGS. 2 to 4, the unit 10 includes a horizontally disposed cylindrical tank 11 having a flat end wall 12 at the front and a hemispherical end wall 13 at the rear. The front flat wall 12 is reinforced on the exterior by a plurality of radial ribs 14 and has a plurality of covers 15, 16 which close off respective apertures for a bank of tubes 17 and a plurality of water separator elements 18. The covers 15, 16 are removable so that the bank of tubes 17 and water separator elements 18 can be inserted into and removed from the tank 11 longitudinally. The bank of tubes 17 is disposed in the upper portion or upper half of the tank 11 while the water separator elements 18 are disposed in two stages in the lower half or lower portion of the tank 11 below the bank of tubes 17; each stage including a pair of separator elements.

Referring to FIG. 3, the bank of tubes 17 is connected to the line 8 (FIG. 1) so as to receive a flow of high pressure saturated steam. The bank of tubes 17 is further disposed between two vertically disposed partition walls 20 which extend longitudinally from the front wall 12 to the hemispherical wall 13. The partition walls 20 are secured to the front wall 12 and are sealingly secured to each other in the form of a wedge at the hemispherical end 13 (FIG. 4), for example, by welding at the juncture. The walls 20 extend upwardly above the bank of tubes 17 as far as the inner cylindrical surface of the tank 11 to either side of two axially spaced outlet spigots 21 disposed in the top of the tank 11. In addition, a number of rods 22 are disposed to extend diagonally within the bank of tubes 17 in order to damp out any vibrations within the bank of tubes 17.

A deflector plate 24 is located in the hemispherical end 13 of the tank 11 on both sides of the vertical central plane of the tank. These two symmetrically disposed deflector plates 24 are inclined in relation to one another to the horizontal central plane and meet in the vertical central plane which extends through the center of the hemispherical end wall 13. A spigot 25 (FIG. 4) is disposed in the hemispherical end wall 13 above the deflector plates 24 to provide an inlet for the partially expanded steam which is to flow into the tank 11 from the line 7.

Each wall has a lower wall portion 23 which adjoins the vertical portions of the walls 20 at the base and which is inclined outwardly toward the side walls of the tank 11. Each wall portion 23 extends from the front wall 12 along the whole length of the tank to merge into the deflector plates 24 inside the hemispherical end 13. Also, a wall 26 is disposed between each wall portion 23 and the adjacent cylindrical side wall portion of the tank 11. Each wall 26 is inclined upwardly and outwardly with respect to the axis of the tank 11 and is also provided with a plurality of uniformly distributed slot-like apertures 27. The apertures 27 are each of a shape such that the slot edge first contacted by the flow of steam is bent outwardly and downwardly, for example, by quarter radius of approximately slot width. Each wall 20 cooperates with the downwardly adjoining wall portion 23, wall 26 and adjacent tank wall to bound a space of gusset-like cross section in order to form a channel which acts as a distribution chamber for the partially expanded wet steam. The two channels which are formed are united in the hemispherical end 13 of the tank 11 to communicate with the spigot 25 to receive wet steam.

A gutter 28 is disposed between each wall 26 and the adjacent wall portion 23 in order to collect any separated water droplets and to convey such by pipes (not shown) to the bottom of the tank 11.

Referring to FIG. 3, the water separator elements 18 are disposed in two levels in the lower portion of the tank 11. The upper levels of the water separator elements 18 are supported on the lower ends of the wall portions 23 to one side while the lower levels of the water separator elements 18 are each connected to an upper level to the opposite side by an inclined wall 30 which extends from the front wall 12 as far as the beginning of the hemispherical end wall 13 and a common vertical wall 32. The inclined walls 30 are disposed between the upper and lower levels of the separator elements so as to direct the wet steam in the lower tank portion to flow in parallel through the water separator elements of the two levels. In addition, each of the inclined walls 30 carries a water gutter 31 which collects and leads any water to suitable pipes (not shown) to the bottom of the tank 11. The vertical wall 32 is disposed in the tank 11 at the lowest point thereof and is sized to extend along the entire length of the tank while projecting upwardly to the level of the lowest level of the water separator elements 18. Also, the wall 32 carries an inverted T section 33 on which the water separator elements 18 of the lower level are supported. In addition, a plurality of transverse walls 41 (FIG. 4) are disposed uniformly over the length of the tank 11 in order to subdivide the lower half of the tank into a number of chambers to which partially expanded wet steam can flow in parallel. These chambers are interconnected together by apertures 45 in the walls 41 through which the water separator elements 18 are inserted as well as by apertures 46 for the separated water in the lower portion of the tank 11.

In operation, partially expanded wet steam enters the tank 11 through the spigot 25 in the hemispherical end wall 13 from the line 7 leading from the high pressure turbine 1 (FIG. 1). The partially expanded wet steam then flows in parallel in the direction indicated by the arrows 35 (FIG. 4) through the two channels of gusset-like cross section on either side of the bank of tubes 17. The wet steam is then uniformly distributed circumferentially of the tank through the apertures 27 into the lower portion of the tank 11. Due to the inclination of the apertures 27, the steam is deflected against the inner tank walls so that large and medium water droplets are immediately separated out. The wet steam then fills the lower portion of the tank so that a first portion of steam flows in the direction indicated by the arrows 37, 38 through the upper level of water separator elements 18 and a remaining second portion flows in the direction indicated by the arrows 39, 40 through the lower level of the water separator elements 18. In flowing through the respective water separator elements 18, the wet steam is further dehydrated so as to deposit out any fine water droplets. Thereafter, the dried steam flows around the pipes of the tube banks 17 and is superheated by the high pressure steam passing through the respective pipes of the bank 17, which is delivered from the line 8 branched from line 6 (FIG. 1).

After passing through the tube bank 17, the superheated steam leaves the unit 10 through the spigots 21 at the upper end and passes on to the low pressure stage 2 of the steam power station via line 7' (FIG. 1). In addition, the water which collects at the bottom of the tank 11 is discharged through a spigot (not shown).

Figure 5:
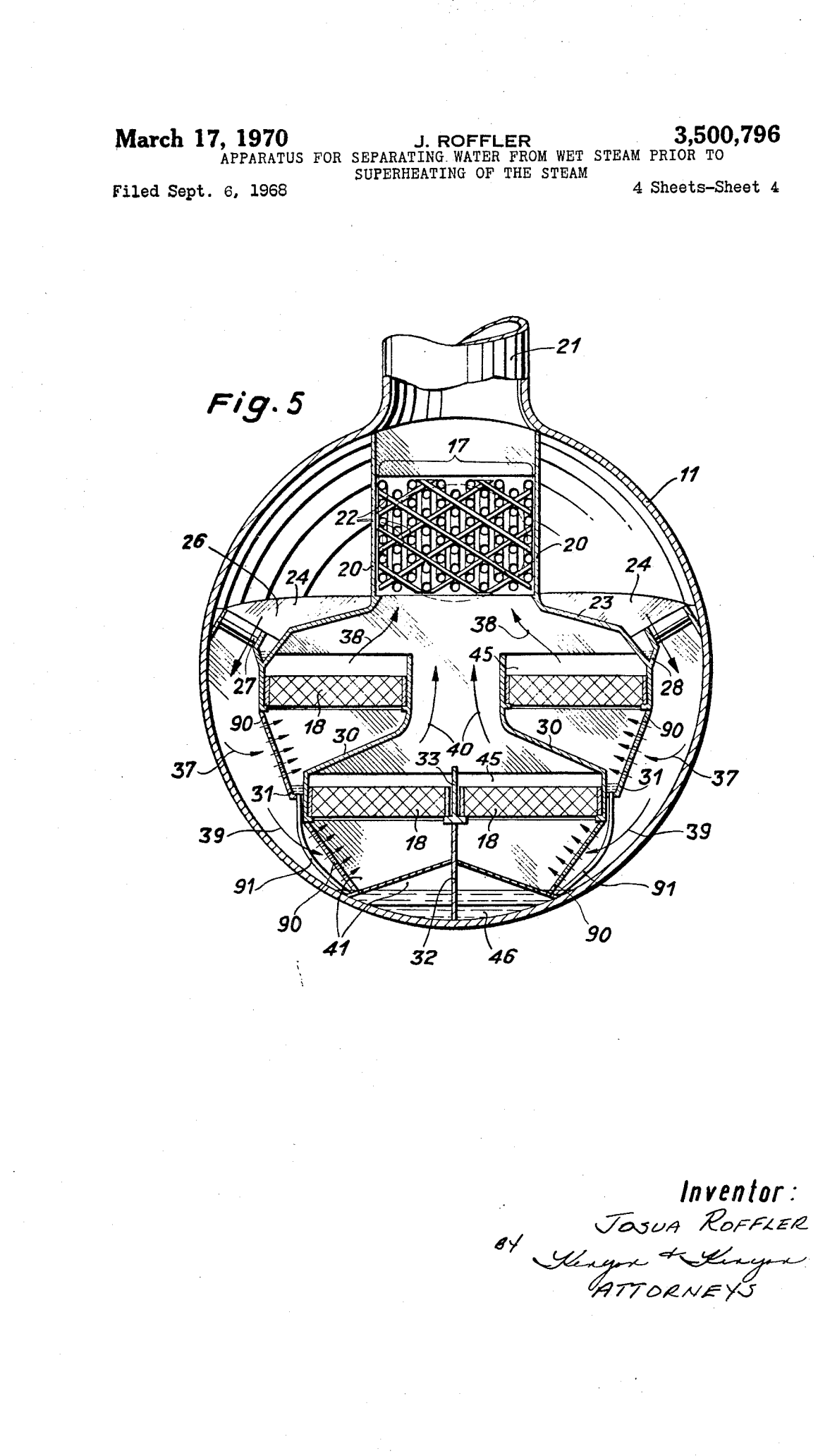

Referring to FIG. 5, wherein like reference characters have been used to indicate like parts as above, since the wet steam changes direction twice in flowing from the distribution chambers into the separator elements 18, turbulence may occur which might cause the wet steam to be distributed less evenly over the separator elements 18. In order to avoid this, baffles 90 are provided at each level where the steam enters the separator elements 18. These baffles 90 extend over the flow cross-section and contain orifices distributed over the flow cross-section in order to smooth out any turbulence. As shown, the baffles 90 are perforated sheets which, in order to facilitate construction, are formed by extensions of the wall portions 23 and walls 30. Also, the lower edges of the perforated sheets at the upper level form part of the liquid collecting gutters 31 while the lower edges of the perforated sheets at the lower level extend to the bottom of the transverse walls 41. In order to draw off the water collected in gutters 31, water discharge pipes 91 are connected to the bottom of the gutters 31 at intervals along the gutter lengths and lead into the collecting chambers at the bottom of the tank. Alternatively, instead of perforated sheets, several layers of expanded metal or several layers of wire gauze with staggered meshes can be used.

As a result of the baffles 90, the apertures 37 in the inclined walls 26 and the distributing chambers therebelow can be made smaller so that a more efficient use is made of the tank volume. That is, more space is made available for the separator elements 18.

It is noted that the vertical wall 32 in the lower portion of the tank 11 prevents turbulence which might otherwise occur if the two steam flows indicated by arrows 40 met at high speed. The wall 32 thus functions to stabilize the two flows against such turbulence. It is also noted that at lower speeds of flow the wall 32 can be eliminated.

What is claimed is:

1. An apparatus for separating water from wet steam comprising
   a horizontally disposed cylindrical tank,
   a plurality of separator elements disposed substantially horizontally in said tank on at least two levels,
   at least one bank of superheater tubes in said tank above said separator elements, and
   a wall extending between each pair of levels of separator elements to direct a flow of steam in parallel through said levels towards said superheater tubes.

2. An apparatus as set forth in claim 1 which includes a pair of rows of separator elements in each level, the rows of separator elements in the upper level being spaced apart a greater distance than the rows of separator elements in the lower level.

3. An apparatus as set forth in claim 1 or 2 wherein said wall supports said separator elements in said tank.

4. An apparatus as set forth in claim 1, 2 or 3 further comprising a perforated baffle at each level for smoothing the flow of steam into said separator elements in said level.

5. An apparatus as set forth in claim 4 wherein each level includes two rows of said separator elements and a baffle adjacent each said row, said baffles in the upper level extending towards the level below.

6. An apparatus as set forth in claims 4 or 5 wherein said baffles are perforated sheets.

7. An apparatus for separating water from wet steam comprising
   a cylindrical tank,
   a plurality of separator elements disposed substantially horizontally in said tank on at least two levels, at least one bank of superheater tubes in said tank above said separator elements,
   a wall extending between each pair of levels of separator elements to direct the flow of steam in parallel through said levels towards said superheater tubes, and
   a perforated baffle at each level for smoothing the flow of steam into said separator elements in said level.

8. An apparatus as set forth in claim 7 wherein said baffles are perforated sheets.

9. An apparatus as set forth in claim 7 wherein said separator elements are staggered with respect to each other to define a graduated arrangement within said tube.

References Cited

UNITED STATES PATENTS

| 3,068,629 | 12/1962 | Jones | 55—349 |
| 3,209,731 | 10/1965 | Schonberger et al. | 122—34 |

FOREIGN PATENTS

| 931,235 | 7/1963 | Great Britain. |

KENNETH W. SPRAGUE, Primary Examiner

U.S. Cl. X.R.

122—483, 488

PO-1050
(5/69)

UNITED STATES PATENT OFFICE
CERTIFICATE OF CORRECTION

Patent No. 3,500,796     Dated March 17, 1970

Inventor(s) Josua Roffler

It is certified that error appears in the above-identified patent and that said Letters Patent are hereby corrected as shown below:

Column 4, line 65, "apertures 37" should be
              --apertures 27--

Column 2, line 6, "separate" should be
              --separator--

Claim 9, line 3, change "tube" to
              --tank--

SIGNED AND
SEALED
AUG 25 1970

(SEAL)
Attest:

Edward M. Fletcher, Jr.
Attesting Officer

WILLIAM E. SCHUYLER, JR.
Commissioner of Patents